United States Patent [19]

Reymore, Jr. et al.

[11] 4,003,859
[45] Jan. 18, 1977

[54] NOVEL PROCESS FOR TRIMERIZING POLYISOCYANATES

[75] Inventors: Harold E. Reymore, Jr., Wallingford; John K. Zane, East Haven, both of Conn.

[73] Assignee: The Upjohn Company, Kalamazoo, Mich.

[22] Filed: May 19, 1975

[21] Appl. No.: 578,428

Related U.S. Application Data

[62] Division of Ser. No. 437,781, Jan. 30, 1974, Pat. No. 3,899,443.

[52] U.S. Cl. .................. 260/2.5 AC; 252/431 C; 260/2.5 AW
[51] Int. Cl.² .................. B01J 31/12; C08G 18/18; C08G 18/24
[58] Field of Search .......... 252/431 C; 260/2.5 AC, 260/2.5 AW

[56] References Cited
UNITED STATES PATENTS

| | | | |
|---|---|---|---|
| 3,075,928 | 1/1963 | Lanham | 260/2.5 AW |
| 3,203,932 | 8/1965 | Frisch et al. | 260/77.5 NC |
| 3,342,757 | 9/1967 | Considine et al. | 260/2.5 AW |
| 3,516,973 | 6/1970 | Kato et al. | 260/78.3 R |
| 3,732,176 | 5/1973 | Hostettler et al. | 260/2.5 AP |

*Primary Examiner*—Melvyn I. Marquis
*Assistant Examiner*—H. H. Fletcher
*Attorney, Agent, or Firm*—James S. Rose; Denis A. Firth

[57] ABSTRACT

A novel catalyst combination for the trimerization of polyisocyanates to polyisocyanurates is disclosed. The catalyst combination comprises (i) a tertiary amine trimerization catalyst, (ii) an alkali metal salt of an N-substituted amide, and (iii) a dibutyl tin di(alkanoate) compound. The use of this catalyst combination in the preparation of polyisocyanurate spray foams enables the systems to be sprayed in either a 1:1 or 2:1 by volume ratio, or ratios between these limits interchangably with no alterations being required in reactant formulations. The polyisocyanurate foams produced using the novel catalyst combination of the invention are characterized by having high resistance to flame and heat distortion.

16 Claims, No Drawings

NOVEL PROCESS FOR TRIMERIZING POLYISOCYANATES

CROSS REFERENCE TO RELATED APPLICATION

This application is a division of our copending application Ser. No. 437,781 filed Jan. 30, 1974 now U.S. Pat. No. 3,899,443.

BACKGROUND OF THE INVENTION

1. Field of the Invention polyisocyanates to polyisocyanurates and

This invention relates to the preparation of polymer foams and is more particularly concerned with novel catalyst combinations for the trimerization of polyisocyanurates ad their utilization in the preparation of polyisocyanurate foams.

2. Description of the Prior Art

Rigid polyisocyanurate foams having high resistance to flame and heat as well as excellent thermal insulating capacity are known in the art. The prior art discloses methods for preparing such foams by reacting an organic polyisocyanate with a trimerizing catalyst in the presence of a blowing agent, and a minor proportion (usually less than 0.5 equivalent per equivalent of polyisocyanate) of a polyol; see for example U.S. Pat. Nos. 3,516,950, 3,580,868, 3,620,986, 3,625,872, and 3,725,319. The process described in U.S. Pat. No. 3,745,133 discloses the use of a combination of an epoxide and a tertiary amine as cocatalysts.

The above methods require the foaming process to proceed in conjunction with at least two polymer forming reactions; namely, the isocyanurate formation arising from the homopolymerization of the isocyanate employed, and the minor amount of polyurethane formation arising from the reaction of a polyol with the isocyanate. Difficulties arise, particularly in commercial applications, due to the variation in relative rates of the two polymerization reactions. The polyurethane formation frequently initiates before the trimerization formation thus giving two separate rise steps in the overall foam rise profile.

These difficulties are accentuated in the case of application of polyisocyanurate foams by spray techniques. The latter normally require that the polyisocyanurate foam forming mixture be supplied in only two streams to the mixing and spraying head. Further these two streams are normally so formulated, by appropriate preblending of components, that they can be brought together either in equal ratio by volume or with the polyisocyanate containing component in twice the ratio by volume of the other component. These requirements are largely dictated by the design of spray equipment currently available.

It would obviously be highly desirable to use the same two components for either of the above ratios or any ratios intermediate therebetween. However, because of the critical role which the nature and proportion of catalyst plays in the preparation of polyisocyanurate foams, it has not hitherto been possible to devise a catalyst which would perform satisfactorily at the different catalyst levels which result when the component ratios are changed in the above manner. Accordingly it has hitherto been necessary to provide substantially different formulations for operation at the different component ratios. Further it has even been very difficult to formulate a system which could be operated satisfactorily when the two components of the system are employed in equal ratio by volume.

We have now found a catalyst system which is free from the above difficulties and which is particularly useful in spray foam systems.

SUMMARY OF THE INVENTION

This invention comprises a cocatalyst system for the trimerization of a polyisocyanate which cocatalyst system comprises:

a. from about 10 to about 70 mole percent of a teritary amine trimerization catalyst;

b. from about 20 to about 80 mole percent of an amide salt having the formula

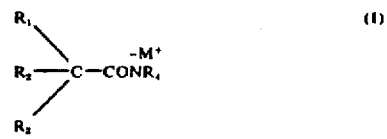

wherein M is an alkali metal, $R_1$, $R_2$, $R_3$ can be the same or different and are selected from the group consisting of H, lower-alkyl, aryl, aralkyl, and cycloalkyl, $R_4$ is selected from the group consisting of lower-alkyl and aryl; and c. from about 3 to about 30 mole percent of a dibutyl tin di(alkanoate) wherein the alkanoate residue contains from 2 to 12 carbon atoms, inclusive.

The invention also comprises an improved process for the preparation of flame and heat resistant cellular polymers, particularly in the form of spray foam in which the major recurring polymer unit is isocyanurate which process comprises bringing together, in the presence of a blowing agent, a polyisocyanate, a minor amount of a polyol, and a cocatalyst system as recited hereinabove.

The invention also comprises the cellular polymers produced in accordance with the above process.

The term "lower alkyl", means alkyl compounds having from 1 to 8 carbon atoms, inclusive, such as methyl, ethyl, propyl, butyl, pentyl, hexyl, heptyl, octyl, and isomeric forms thereof. The term "aryl" means phenyl, tolyl, xylyl, napththyl, diphenylyl and the like. The term "aralkyl" means benzyl, p-methylbenzyl, p-ethylbenzyl, β-phenylethyl, naphthylmethyl, and the like. The term "cycloalkyl" means cyclobutyl, cyclopentyl, cyclohexyl, methyl-cyclohexyl, cyclooctyl, and the like. The term "alkali metal" means sodium, potassium, and lithium.

In the dibutyl tin di(alkanoate) the term, "alkanoate residue contains from 2 to 12 carbon atoms, inclusive", includes, acetate, propionate, butyrate, valerate, caproate, enanthoate, capryloate, pelargonate, capriate, hendecanoate, laurate and isomeric forms thereof.

DETAILED DESCRIPTION OF THE INVENTION

As discussed above, the need to balance two different reactions, namely that leading to urethane and that leading to isocyanurate, in the preparation of polyisocyanurates makes the choice of catalyst particularly important. This is especially so in the preparation of systems for application by spray techniques.

It is an object of the present invention to prepare high temperature and fire resistant polyisocyanurate cellular polymers, particularly by spray application on a variety of substrate materials. It is a further object to provide formulations which can be employed for spray at ratios from 1:1 to 2:1 or ratios therebetween, and can be changed from one ratio to another without the need for changing formulations or catalyst concentration in any way.

It is well known to those skilled in the spray foam art that two streams of reactants feed into a spray gun. The A component contains the polyisocyanate being used along with any other additives non-reactive with the isocyanate, such as blowing agent, etc. In the polyurethane spray art, the B component contains the polyol component in equivalent amount to the polyisocyanate along with the catalyst, surfactant, or other additives non-reactive with the polyol, or catalyst. For obvious mechanical reasons it is advantageous to formulate the components so that A and B can be pumped at a 1:1 volume ratio. In normal practice, the ratio of A:B will not be exactly 1:1 on a weight basis. However, in spraying polyisocyanurate foams wherein the polyol component is present only in minor amounts, it is necessary to make extensive formulation adjustments in order to obtain a 1:1 by volume ratio. Usually, the deficiency in the B volume side is made up by the addition of other additive materials such as non-reactive fire retardants and the like. The catalyst concentration required to provide optimum rise characteristics for that particular formulation is determined and becomes a constant thereto. When spraying a polyisocyanurate foam at a 2:1 volume ratio, the optimum catalyst concentration applicable thereto will be different from that at the 1:1 ratio, assuming the same catalyst has been employed.

We have now found, surprisingly and unexpectedly, that a particular cocatalyst combination set forth herein permits the formulation of a spray system which can be used as 1:1 or 2:1 ratio spray without need to make any adjustment to reactant or catalyst proportions in order to obtain satisfactory spray foam. The advantages which flow from such finding will be readily apparent.

The novel catalyst combinations of the present invention comprise the ingredients set forth above.

The cocatalyst components are brought together during or immediately prior to the trimerization reaction of the polyisocyanate. In an optional step the tertiary amine and amide salt (I) can be premixed or stored as a mixture in which case the dibutyl tin di(alkanoate) is kept separate until it is desired to carry out the trimerization process of the invention.

The components of the catalyst combination of the invention and the concentration ranges of said components are set forth hereinbelow in detail in the form of mole percentages. It is to be understood that the sum total of the individual mole percent concentrations chosen for each component must equal 100 mole percent. It is also to be understood that concentrations of one or more components can be varied within the specified ranges so long as the appropriate adjustments are made in one or more of the remaining components so that the total mole percent is 100. This method of indicating the proportions of the three components of the cocatalyst is adopted in defining the parameters of the cocatalyst itself. However, when particular embodiments of the use of the cocatalyst are described hereinbelow, e.g. in the preparation of a polyisocyanurate cellular polymer, the amounts of the components of the cocatalyst will be set forth in absolute terms.

1. The teritary amine component of the cocatalyst combination is advantageously employed in the combination in a proportion in the range of from about 10 mole precent to about 95 mole percent and, preferably from about 10 mole percent to about 70 mole percent. The said tertiary amine component can be any of the tertiary amine trimerization catalysts known in the art and includes those amines set forth in U.S. 3,745,133 in Column 8, lines 1–73 and which are herein incorporated by reference. A particularly preferred class of tertiary amines consists of the following: N,N-dimethylethanolamine, N,N-dimethylcyclohexylamine, N,N-dimethylbenzylamine, N,N,N',N'-tetramethyl-1,3-butanediamine, N,N,N',N'-tetramethylpropanediamine, N-methylmorpholine, N-ethylmorpholine, and N,N',N''-tris(dimethylaminopropyl)hexahydrotriazine. A particularly preferred species of teritary amine is N,N-dimethylcyclohexylamine.

2. The amide salt component of the cocatalyst combination having the formula (I), is advantageously employed in a proportion in the range of from about 2 mole percent to about 85 mole percent of the cocatalyst and, preferably, in the range from about 20 mole percent to about 80 mole percent. The compounds of formula (I) are prepared by bringing together under anhydrous conditions the appropriate acid salt of formula

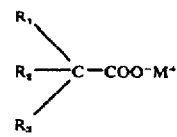

dissolved in a solvent, with the appropriate organic isocyanate of formula $R_4NCO$ wherein $R_1$, $R_2$, $R_3$, $R_4$, and M have the significance defined above. The isocyanate is added slowly to the salt solution whereupon an exotherm occurs and carbon dioxide is evolved.

Examples of solvents for the above reaction include low molecular weight polyols such as ethylene glycol, diethylene glycol, dipropylene glycol, dibutylene glycol, tetraethylene glycol, glycerol, the liquid polyethylene glycols such as the polyoxyethylene glycols prepared by the addition of ethylene oxide to water, ethylene glycol or diethylene glycol, and the like; Cellosolve, butyl Cellosolve, Carbitol, methyl Carbitol, butyl Carbitol, and the like; ethanolamine, diethanolamine, triethanolamine; and dipolar aprotic solvents such as dimethyl formamide, dimethyl acetamide, N-methylpyrrolidone, dimethyl sulfoxide, and the like; and mixtures of any of the aforesaid solvents. The reaction between the acid salt and the isocyanate compound is so much faster than the reaction between the isocyanate compound and the hydroxyl containing solvents, that the rate difference allows the use of the latter as a preferred class of solvents. The preparation of the compounds of formula (I) is illustrated by the following equation:

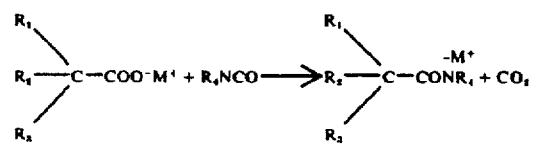

In an optional step the solvent can be removed, however, it is usually found advantageous to leave the salt dissolved in the solvent and thereafter use the catalyst in combination with its diluent. When the solvent is removed, the amide salt can be used in its isolated form; however, precautions should be taken to protect it from atmospheric moisture prior to its use in the cocatalyst combination.

Typical examples of the starting acid salt include: sodium acetate, potassium acetate, lithium acetate, sodium propionate, potassium propionate, lithium propionate, sodium hexanoate, potassium hexanoate, lithium hexanoate, potassium decanoate, potassium 2-methylhexanoate, potassium 2-ethylhexanoate, potassium neopentanoate, sodium phenyl acetate, poatassium phenyl acetate, lithium phenyl acetate, potassium β-phenyl propionate, potassium p-tolyl acetate, potassium cyclohexyl acetate, potassium 4-methylcyclohexyl acetate, potassium β-cyclohexyl propionate, and the like. Typical examples of the starting organic isocyanate include: butyl isocyanate, octyl isocyanate, phenyl isocyanate, tolyl isocyanate, and the like. The proportions of reactants employed in preparing the compound (I) are in the molar ratio of 1:1.

A particularly preferred species of amide salt having the formula (I) is potassium N-phenyl-2-ethylhexamide.

In a preferred embodiment of the invention the salt (I) is employed in the cocatalyst in combination with a diluent. The diluent can be the reaction solvent, or mixtures thereof, employed in the preparation of compound (I). A particularly preferred class of diluents consists of ethylene glycol, diethylene glycol, polyethylene glycol 400, and mixtures thereof and mixtures of this preferred class with dimethyl formamide. A particularly preferred diluent mixture consists of ethylene glycol and dimethyl formamide. The concentration of the salt (I) dissolved in the diluent is not critical and can vary from about 25 percent to about 75 percent by weight. When a mixture of diluents is used the proportion by weight of one diluent in the other is advantageously from about 10 to about 90 percent by weight, and preferably from about 25 to about 75 percent by weight.

3. The tin salt component of the cocatalyst system, is advantageously employed in a proportion in the range of from about 1 mole percent to about 45 mole percent and, preferably from about 3 mole percent to about 30 mole percent. The tin salt component can be any of the dibutyl tin di(alkanoate) compounds known in the foam art as urethane type catalysts (see M & T Chemicals, Inc., Bulletin C-66) and includes dibutyl tin diacetate, dibutyl tin dioctoate, dibutyl tin di-2-ethyl-hexoate, and dibutyl tin dilaurate. A particularly preferred tin salt compound of the cocatalyst combination is dibutyl tin diacetate.

While the catalyst combination described hereinabove specifically requires the use of three different catalyst components in combination, it is to be understood that this does not exclude the presence in the catalyst combination of additional components or agents capable of causing the trimerization of a polyisocyanate provided the three components discussed above are present.

The polyols employed in preparing polyisocyanurate foams in accordance with the present invention can include any of the polyols set forth in U.S. Pat. No. 3,745,133, incorporated herein by reference, or any of those known in the art to be useful as a minor component in the preparation of polyisocyanurate foams; see supra. Said polyols can be added separately during the trimerization of the polyisocyanate component, or can be prereacted with the polyisocyanate to form an isocyanate terminated prepolymer which is subsequently trimerized. The polyols are advantageously employed in the range from about 0.01 equivalent to about 0.3 equivalent per equivalent of isocyanate.

The polyisocyanates employed in the preparation of polyisocyanurate foams in accordance with the present invention can be any of the organic polyisocyanates conventionally employed in the art for this purpose previously; see the art cited supra. Advantageously, in order to obtain foams having exceptionally high heat resistance and structural strength, the polyisocyanates employed in the process of the invention are polymethylene polyphenyl polyisocyanates, particularly those set forth in U.S. Pat. No. 3,745,133. A particularly preferred form of polymethylene polyphenyl polyisocyanate is one having an acidity, expressed as "% hot HCl" of less than about 0.1 percent. Various methods of reducing the acidity to such levels are known in the art. A particularly useful process is that set forth in German OLS No. 2,249,375. The latter process comprises treating the polyisocyanate with from 0.25 to 1 equivalent of monomeric epoxide for each equivalent of acid present in the polyisocyanate.

In carrying out the preparation of polyisocyanurate foams in accordance with the process of the invention, the procedures and equipment conventional in the art are employed. The proportions of cocatalyst are so chosen that, for each equivalent of polyisocyanate present in the reaction mixture, there is employed from 0.005 to 0.04 equivalent, preferably from 0.01 to 0.03 equivalent, of said tertiary amine component, from 0.001 to 0.03 equivalent, preferably from 0.003 to 0.02 equivalent of said compound (I), and from 0.0005 to 0.005 equivalent, preferably from 0.001 to 0.003 equivalent of said compound (II).

Foaming agents, and other optional additives such as dispersing agents, cell stabilizers, surfactants, flame retardants, and the like, can be employed according to the teachings of the incorporated reference. A particularly preferred class of flame retardant additives are the phosphorus containing flame retardants, such as: tris(2-chloroethyl)phosphate, tris(2-chloropropyl)phosphate, tris(2,3-dibromopropyl)phosphate, tris(1,3-dichloroisopropyl)phosphate, and the like.

As set forth above, the use of the cocatalyst combination of the present invention provides for the spray application of polyisocyanurate heat and flame resistant foams at variable spray ratios of 1:1 to 2:1 and ratios therebetween without the need for changing foam formulations. Standard foam spraying equipment well known to those skilled in the art can be used in carrying out the specific embodiments of the present invention. This includes the various types of spray guns known to those skilled in the art. The foams made in accordance with the invention show good adhesion to a variety of substrates including masonite, building board, gypsum board, asbestos board (transite), wood, plywood, sheet metal, and paper products such as Kraft paper and heavy cardboard. Thus, the cellular products of the invention can be employed for all the purposes for which the currently produced cellular spray products are conventionally employed and are particularly suitable for applications where thermal resistance, low flame spread and low smoke generation on combustion are required.

For example, the cellular products of the invention can be employed as thermal barriers and insulating materials when sprayed on high temperature pipe lines, ovens, and storage tanks containing fluids at elevated temperatures. The foams made in accordance with the present invention also find use in cryogenic applications where insulation of pipes or tanks holding fluids at low temperatures require thermal insulation.

The particular embodiment of the variable spray ratio provides for a unique advancement in the spray foam art whereby an object requiring insulative protection, for example, a storage tank containing a liquid at an elevated temperature, is sprayed with the polyisocyanurate foam of the invention at the 1:1 component ratio. This provides a covering of cellular foam having the optimum insulation value. Then the pumping ratio is changed to 2:1 and a second layer of higher density cellular foam is applied over the first, thereby affording protection for the first layer by virtue of its higher physical strength. This embodiment of the invention obviates the necessity of varying formulations when it becomes necessary to change the density of the foam being sprayed, which finds special utility when spraying foam in remote areas. The heat and flame resistant foams of the present invention are particularly useful because of their ease of application in the construction of industrial buildings.

Non-cellular polymers can also be made in accordance with the present invention using standard techniques known to those skilled in the art but employing the cocatalyst combinations of this invention. Solid polymers are obtained by carrying out the trimerization of a polyisocyanate using the same reactants employed in the cellular polymers but in the absence of the blowing agent. The reactants can be cast, molded, coated, or otherwise deposited by methods known to those skilled in the art, to form a solid polyisocyanurate casting, molding, coating, or other form of solid polyisocyanurate. Such products find use for example, in high temperature resistant laminates prepared from reinforcing layers of heat resistant fabric such as glass fabric, graphite fabric, and the like, and layers of polyisocyanurate of the invention.

The following preparations and examples describe the manner and process of making and using the invention and set forth the best mode contemplated by the inventors of carrying out the invention but are not to be construed as limiting. The pertinent test procedures relating to the invention are defined as follows.

Acidity Determination

Two grams of the isocyanate to be analyzed is mixed with 75 ml. each of toluene and methanol in a 250 ml. Griffin beaker. The beaker is covered with a watch glass and the mixture refluxed for 5 minutes with stirring. The mixture is then allowed to cool to room temperature. Employing a Fisher Accumet pH meter with combination electrode, the mixture is titrated at a constant rate with 0.02 N potassium hydroxide in methanol to a pH of 7.7. A standard blank is prepared by carrying a mixture of 75 ml. each of toluene and methanol through the same procedure outlined above. The acid content of the isocyanate is then calculated according to the equation:

$$\% \text{ Acid} = (A - B) \times 0.0365$$

wherein A is the number of milliters of potassium hydroxide solution used to titrate the isocyanate mixture and B is the number of milliters of potassium hydroxide used to titrate the standard blank.

The number of equivalents of acid present in a given polyisocyanate are determined by the formula:

$$\text{Equivalents Acid} = \frac{(\% \text{ Acid}) (\text{Grams Isocyanate to be treated})}{36.5}$$

Preparation 1

Potassium N-phenyl-2-ethylhexamide

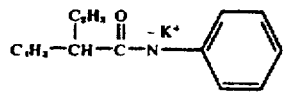

A 1 liter 3 neck flask was fitted with a mechanical stirrer, a thermometer, an addition funnel, and a gas in-let tube. The apparatus was thoroughly dried and then the flask was charged with 182.2 g. (1.0 mole) of potassium 2-ethylhexanoate dissolved in 168 g. of ethylene glycol. During constant stirring and under a slight nitrogen pressure, 119.1 g. (1.0 mole) of phenyl isocyanate was slowly added dropwise. The reaction mixture exothermed to 60° C and carbon dioxide was evolved. The resulting clear solution started to precipitate small crystals upon cooling. However, the addition of 175 g. of dimethyl formamide yielded a clear yellow solution having the following properties: Equivalent weight = 141; Acid No. = 3.4; Viscosity at 25° C = 53 cstk. This solution of potassium N-phenyl-2-ethylhexamide can be used directly as a catalyst component. A crude yield of the salt was obtained when ethylene glycol and dimethyl formamide were removed by heating the solution at steambath temperature under 0.2 mm. pressure and protecting the product from atmospheric moisture. A semi-crystalline orange residue remained, wt. = 275 g. It was stored in a vacuum desiccator until used as a cocatalyst component.

Preparation 2

Potassium N-butyl-2-ethylhexamide

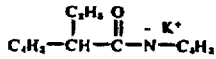

A 1 liter 3 neck flask equipped as in Preparation 1 was charged with 182.2 g. (1.0 mole) of potassium 2-ethylhexanoate dissolved in 158 g. of ethylene glycol. During constant stirring 99.1 g. (1.0 mole) of butyl isocyanate was slowly added dropwise. The reaction mixture evolved carbon dioxide and exothermed to about 50° C. The resulting clear yellow solution showed an increase in viscosity over the starting solution and had the following properties: Equivalent Weight = 90; Acid No. = 3.8; Viscosity at 25° C = 560 cstk. This solution of potassium N-butyl-2-ethylhexamide can be used directly as a catalyst component. A crude yield of the salt was obtained when the ethylene glycol was removed by heating the solution at steam-bath temperature under 0.2 mm. pressure and protecting the product from moisture. A semi-crystalline orange residue remained, wt. = 267 g. It was stored in a vacuum desiccator until used as a cocatalyst component.

Preparations 3-14

Using the procedure of Preparation 1 wherein 168 g. of ethylene glycol and 175 g. of dimethylformamide were used together as co-solvents and substituting the alkali metal carboxylic acid salts and organic isocyanates set forth in the following table, the corresponding amide salts were obtained as listed therein. The salts are characterized by the percent by weight of solvent content which itself consisted of 49 percent by weight of ethylene glycol and 51 percent by weight of dimethyl formamide. Removal of the solvent to provide the crude yield of amide salt was readily accomplished by heating the solution in vacuo.

similar spray foam in which one of the components of the cocatalysts of the invention is lacking. The foams were sprayed using a Binks 43P gun equipped with a 2640 tip and a 0.026 inch preorifice and two each 0.035 inch impingement orifices. A and B component pressures of 800–1100 psi were used and the volume ratio was 1:1. Spray runs were made on cardboard, plywood, or transite board with good adhesion in all examples. The A component in all three examples of Table I was a polymethylene polyphenyl isocyanate containing about 40 percent by weight of methylenebis (phenyl isocyanate) which had been treated with a minor amount of monomeric epoxide in accordance with the method taught in U.S. Pat. 3,793,362 for reducing acidity. The resultant polyisocyanate had an isocyanate equivalent of about 135 and a percent acid-

| Prep. | Acid Salt (1.0 mole) | Isocyanate (1.0 mole) | Product | Solvent % (by wt.) |
|---|---|---|---|---|
| 3 | Na$^1$ acetate | Phenyl- | Na N-Phenylacetamide | 68 |
| 4 | K$^2$ acetate | Phenyl- | K N-Phenylacetamide | 66 |
| 5 | Li$^3$ acetate | Phenyl- | Li N-Phenylacetamide | 70 |
| 6 | K propionate | Phenyl- | K N-Phenylpropionamide | 65 |
| 7 | Na 2-ethylhexanoate | Phenyl- | Na N-Phenyl-2-ethylhexamide | 59 |
| 8 | K 2-ethylhexanoate | p-Tolyl- | K N-(p-Tolyl)-2-ethylhexamide | 55 |
| 9 | Li 2-ethylhexanoate | α-Naphthyl- | Li N-(α-Naphthyl)-2-ethylhexamide | 55 |
| 10 | K decanoate | 4-Biphenylyl- | K N-(4-Biphenylyl)-decanoamide | 49 |
| 11 | K β-phenylpropionate | Phenyl- | K N-Phenyl-β-phenylpropionamide | 57 |
| 12 | K cyclohexylacetate | Phenyl- | K N-Phenyl-cyclohexylacetamide | 57 |
| 13 | K phenylacetate | Phenyl- | K N-phenylacetamide | 58 |
| 14 | K α-naphthylacetate | Phenyl- | K N-Phenyl-α-naphthylacetamide | 53 |

$^1$Na: Sodium
$^2$K: Potassium
$^3$Li: Lithium

Preparations 15-22

Using the procedure of Preparation 2 wherein 158 g. of ethylene glycol was used as solvent, and substituting the potassium carboxylic acid salts and organic isocyanates set forth in the following table, the corresponding amide salts were obtained as listed therein. The salts are characterized by the percent by weight of solvent content of ethylene glycol. Removal of the solvent to provide the crude yield of amide salt was readily accomplished by heating the solution in vacuo.

ity of less than 0.1%. The B component consisted of a minor amount of a polyol, a surfactant, a blowing agent, and the catalyst combination. Foams A and B employed a catalyst combination of dimethylcyclohexylamine, dibutyl tin diacetate and potassium N-phenyl-2-ethylhexamide, along with potassium 2-ethylhexoate (a previously known trimerization catalyst). Foam C on the other hand did not contain the hexamide but a large proportion of potassium 2-ethylhexoate salt was employed to obtain cream and initiation times in line with Foams A and B. However, the 5 minute firm time for

| Prep. | Acid Salt (1.0 mole) | Isocyanate (1.0 mole) | Product | Solvent % (by wt.) |
|---|---|---|---|---|
| 15 | K$^1$ acetate | Butyl- | K N-Butylacetamide | 50 |
| 16 | K propionate | Methyl- | K N-Methylpropionamide | 55 |
| 17 | K propionate | Ethyl- | K N-Ethylpropionamide | 53 |
| 18 | K propionate | Butyl- | K N-Butylpropionamide | 48 |
| 19 | K propionate | t-Butyl | K N-t-Butylpropionamide | 48 |
| 20 | K propionate | Hexyl | K N-Hexylpropionamide | 45 |
| 21 | K propionate | Octyl- | K N-Octylpropionamide | 40 |
| 22 | K β-phenylpropionate | Butyl- | K N-Butyl-β-phenylpropionamide | 39 |

$^1$K: Potassium

EXAMPLE 1

The following shows a comparison of two spray foams made in accordance with the invention with a Foam C is an unacceptably long time for a spray application. Foams A and B had good firm times and good flame and heat resistance.

TABLE I

| Foams | A | B | C |
|---|---|---|---|
| Ingredients: | | | |
| Component A: | | | |
| Polyisocyanate | 135 | 135 | 135 |
| Component B: | | | |
| Tris-β-chloropropyl phosphate | 16.6 | 16.8 | 16.7 |

TABLE I-continued

| Foams | A | B | C |
|---|---|---|---|
| DC-193[1] | 3.32 | 3.36 | 3.33 |
| Freon 11-B[2] | 38.7 | 39.1 | 38.4 |
| LA-700[3] | 3.32 | 3.36 | |
| Polyester I[4] | 76.3 | | |
| Polyester II[5] | | 77.2 | 76.8 |
| Dibutyl tin Diacetate | 0.6 | 0.6 | 0.6 |
| N,N-Dimethyl Cyclohexylamine | 3.32 | 3.36 | 3.33 |
| Catalyst I[6] | 2.21 | 2.24 | |
| Catalyst II[7] | 7.74 | 7.83 | 11.1 |
| Volume Ratio A/B | 1:1 | 1:1 | 1:1 |
| Wt. Ratio A/B | 0.9:1 | 0.9:1 | 0.9:1 |
| Rise Characteristics: | | | |
| Cream, sec. | :03 | :02 | :01 –.02 |
| Initiation, sec. | :03 | :02 | :02 |
| Rise 1, sec. | :07 | :08 | :06 |
| Rise 2, sec. | :11 | :12 | :10 |
| Tack Free, sec. | :11 | :11 | |
| Firm, sec. | :80 | :90 | 5:00 |
| Density, pcf | 2.02 | 2.08 | 5 minute firm time is unacceptable for proper spray application. |
| Friability,[8] % wt. loss | 2.0 | 2.1 | |
| Oxygen Index[9] (%) | 29.3 | 28.4 | |
| TGA[10] 50% wt. loss (at ° C) | 445 | 465 | |
| TGA % wt. loss at: | | | |
| 400° C | 39 | 34 | |
| 500° C | 58 | 56 | |
| 600° C | 68 | 66.5 | |
| 700° C | 83 | 77.5 | |

[1]DC-193: A silicone surfactant sold by Dow Corning Corp.; see, "Dow Corning 193 Surfactant", Bulletin: 05-146, February, 1966
[2]Freon 11-B: Trichlorofluoromethane, product of DuPont Corporation.
[3]LA-700: Union Carbide Polyether for Rigid Foams Average Hydroxyl Number = 700, see "Chemicals and Plastics Physical Properties," Union Carbide, p. 22, 1969 Edition.
[4]Polyester I: The polyester obtained by esterifying 1 mole of chlorendic anhydride with 1.1 moles of diethylene glycol and 2.5 moles of ethylene oxide.
[5]Polyester II: The polyester obtained by esterifying 1 mole of chlorendic anhydride with 1.1 moles of diethylene glycol and 2.5 moles of propylene oxide.
[6]Catalyst I: A solution consisting of 43 percent by weight of potassium N-phenyl-2-ethylhexamide, 28 percent by weight of ethylene glycol, and 29 percent by weight of dimethyl formamide.
[7]Catalyst II: A 50% solution by weight of potassium 2-ethylhexoate dissolved in ethylene glycol.
[8]Friability as measured by the ASTM C421-61 (Reapproved 1967) test.
[9]Oxygen Index, ASTM D 2863-70 test. Flammability test reporting the percent oxygen content required to sustain sample combustion.
[10]Thermal gravimetric analysis was performed on a DuPont Model 900 Thermal Analyzer using the Model 950 Thermogravimetric Module.

EXAMPLE 2

The examples set forth in Table II show a specific embodiment of the invention as Foam D compared to Foam E which was prepared using a catalyst combination not in accordance with the invention. Both foams were sprayed on both transite and cardboard using a Grayco Bulldog Model 985-928 with a Grayco 232 finishing tip. The systems were sprayed at a volume ratio of 2:1 with component A and B pumps at 1050-1150 psi. Foam D shows superior compressive strength as well as better flame resistance as measured by the Oxygen Index and Mine Safety Tests when compared to Foam E. Both D and E contained the same polyisocyanate of low acidity as set forth in Example 1 while Foam D was prepared using the same Catalyst I as in Foams A and B of the previous Example.

TABLE II

| Foams | D | E |
|---|---|---|
| Ingredients: | | |
| Component A: | | |
| Polyisocyanate | 134 | 134 |
| Tris(β-chloroethyl)phosphate | 15 | 15 |
| L-5340 | 1 | |
| L-5310 | | 2 |
| Component B: | | |
| Polyester III[1] | 30 | |
| LA-700 | 10 | |
| Hetrofoam-320[2] | | 30 |
| Polyol[3] | | 5 |
| n-butanol | 2 | 5 |
| DC-193 | 1 | 1 |

TABLE II-continued

| Foams | D | E |
|---|---|---|
| Freon 11-B | 28 | 31.5 |
| Dibutyl tin Diacetate | 0.5 | 0.5 |
| N,N-Dimethyl Cyclohexylamine | 3 | 3 |
| Catalyst I | 5 | |
| Potassium Acetate | | 1 |
| Volume Ratio A/B | 2:1 | 2:1 |
| Wt. Ratio A/B | 1.9:1 | 1.9:1 |
| Rise Characteristics: | | |
| Cream, sec. | :01 | :02 |
| Gel, sec. | :03–:04 | :07 |
| Rise, sec. | :08–:09 | :12 |
| Firm, sec. | :10 | :15 |
| Density, pcf | 2.36 | 2.39 |
| Compressive Strength (psi) | | |
| $\parallel$ to rise | 27 | 24.2 |
| $\perp$ to rise | 24 | 17.2 |
| Friability % wt. loss | 10 | 9.4 |
| Oxygen Index (%) | 29 | 27.5 |
| Mine Safety Burn Through[4] | 0.6 | 0.32 |

TABLE II-continued

| Foams | D | E |
|---|---|---|
| (hr./in.) | | |

Footnotes to TABLE II
¹Polyester III: The polyester used in this example consisted of 27.6 parts of the product of esterifying 1 mole of chlorendic anhydride with 1.1 moles of diethylene glycol and 2.5 moles of propylene oxide, blended with 2.4 parts of diethylene glycol.
²Hetrofoam 320: A rigid urethane foam polyester polyol based on chlorendic acid, hydroxyl number = 320. See, "Hetrofoam 320 and Polyphenylisocyanates in Fire Retardant Rigid Urethane Foams," Service Bulletin No. 3013, October 1963.
³Polyol: A polyol formed by the reaction of 3 moles of ethylene oxide with trimethylolpropane having an equivalent weight of about 93.
⁴Bureau of Mines, flame penetration test.

EXAMPLE 3

Foams F and G of Table III were sprayed at component A and B ratios of 1:1 and 2:1, respectively, utilizing the same formulation in both Foams F and G without any catalyst concentration change within the B component, only the B component ratio adjustment which resulted in the reactant proportions as shown in Table III. The machine employed was a Gusmer Model FF Proportioner and the gun, a Gusmer Model D. At the 1:1 spray ratio the A and B component pressures were both 800 psi and both sides employed Gusmer proportioning pumps No. 450-60. At the 2:1 ratio, A component pressure was 900 psi and the proportioning pump was a No. 450-60 and the B component pressure was 700 psi and the pump a No. 450-30. Foams F and G had similar rise characteristics. The flame and heat resistance of both foams are very similar while the physical strength of Foam G is higher than Foam F which is a reflection of the density difference. The same epoxide treated polyisocyanate as used in the previous examples was employed in the formulation of Foams F and G.

TABLE III

| Foams | F | G |
|---|---|---|
| Ingredients: | | |
| Component A: | | |
| Polyisocyanate | 135 | 135 |
| Component B: | | |
| Polyester III | 70 | 35 |
| Tris(β-chloroethyl)phosphate | 26 | 13 |
| DC-193 | 3 | 1.5 |
| Freon 11-B | 38.4 | 19.2 |
| Catalyst I | 9 | 4.5 |
| Dibutyl tin Diacetate | 0.6 | 0.3 |
| N,N-Dimethyl Cyclohexylamine | 3 | 1.5 |
| Ratio of NCO:OH | 1:0.34 | 1:0.17 |
| Volume Ratio A/B | 1:1 | 2:1 |
| Rise Characteristics: | | |
| Cream, sec. | :02 | :02 |
| Initiation, sec. | :02 | :02 |
| Rise 1, sec. | :04 | :04 |
| Rise 2, sec. | :09 | :12 |
| Firm | :28 | :17 |
| Density, pcf | 2.1 | 3.6 |
| Friability, % wt. loss | 2 | 5.3 |
| Compressive Strength (psi) | | |
| ∥ to rise | 15.2 | 35.4 |
| ⊥ to rise | 16.8 | 45.4 |
| Mine Safety Burn Through (hr./in.) | 0.75 | 0.87 |
| Oxygen Index (%) | 30.8 | 32.8 |
| TGA 50% wt. loss (at ° C) | 515 | 680 |
| TGA % wt. loss at: | | |
| 400° C | 24 | 14.5 |
| 500° C | 47.5 | 35 |
| 600° C | 58.5 | 43 |
| 700° C | 67 | 52 |

We claim:
1. In a process for the preparation of a cellular polymer in which the major recurring polymer unit is isocyanurate which process comprises bringing together in the presence of a blowing agent, a polyisocyanate, a trimerization catalyst, and from about 0.01 to about 0.3 equivalent per equivalent of said polyisocyanate of a polyol, wherein the improvement consists essentially of employing as the catalyst, a combination of the following ingredients:
   a. from 0.005 to 0.04 equivalent per equivalent of said polyisocyanate of a tertiary amine trimerization catalyst;
   b. from 0.001 to 0.03 equivalent per equivalent of said polyisocyanate of an amide salt having the formula

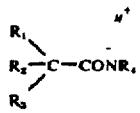

wherein M is an alkali metal, $R_1$, $R_2$, $R_3$ can be the same or different and are selected from the group consisting of H, lower alkyl, aryl, aralkyl, and cycloalkyl, $R_4$ is selected from the group consisting of lower alkyl and aryl; and
   c. from 0.0005 to 0.005 equivalent per equivalent of said polyisocyanate of a dibutyl tin di(alkanoate) wherein the alkanoate residue contains from 2 to 12 carbon atoms, inclusive.

2. The process according to claim 1 wherein said polyisocyanate is polymethylene polyphenyl isocyanate containing about 30 percent to about 85 percent by weight of methylenebis(phenyl isocyanate).

3. The process according to claim 1 wherein said polyisocyanate has an acidity less than about 0.10 percent.

4. The process according to claim 1 wherein the polyisocyanate has been previously mixed at room temperature with about 0.25 equivalent to about 1.0 equivalent of a monomeric epoxide per equivalent of acid present in said polyisocyanate to reduce acidity to less than about 0.10 percent.

5. The process according to claim 4 wherein said epoxide is 3,4-epoxycyclohexylmethyl-3,4-epoxycyclohexane carboxylate.

6. The process according to claim 1 wherein the tertiary amine is N,N-dimethylcyclohexylamine.

7. The process according to claim 1 wherein the amide salt is potassium N-phenyl-2-ethylhexamide.

8. The process according to claim 1 wherein the tin salt is dibutyl tin diacetate.

9. The process according to claim 1 wherein the amide salt is present in the form of a solution containing from about 25 percent to about 75 percent by weight in a diluent.

10. In a process for the preparation of a cellular polymer in which the major recurring polymer unit is isocyanurate which process comprises bringing together in the presence of a blowing agent, a polyisocyanate, a trimerization catalyst, and from about 0.01 to about 0.3 equivalent per equivalent of said polyisocyanate of a polyol, wherein the improvement consists essentially of employing as the catalyst, a combination of the following ingredients:
  a. from 0.005 to 0.04 equivalent per equivalent of said polyisocyanate of N,N-dimethylcyclohexylamine;
  b. from 0.001 to 0.03 equivalent per equivalent of said polyisocyanate of potassium N-phenyl-2-ethylhexamide; and
  c. from 0.0005 to 0.005 equivalent per equivalent of said polyisocyanate of dibutyl tin diacetate.

11. The process according to claim 10 wherein the polyisocyanate is polymethylene polyphenyl isocyanate containing from about 30 percent to about 85 percent by weight of methylenebis(phenyl isocyanate).

12. The process according to claim 11 wherein said polyisocyanate has an acidity less than about 0.10 percent.

13. The process according to claim 11 wherein said polyisocyanate has been previously mixed at room temperature with about 0.25 equivalent to about 1.0 equivalent of a monomeric epoxide per equivalent of acid present in said polyisocyanate to reduce acidity to less than about 0.10 percent.

14. The process according to claim 13 wherein said epoxide is 3,4-epoxycyclohexylmethyl-3,4-epoxycyclohexane carboxylate.

15. The process according to claim 10 wherein said amide salt is present in the form of a solution from about 25 percent to about 75 percent by weight in a diluent.

16. The process according to claim 15 wherein said diluent is a mixture of ethylene glycol and dimethyl formamide.

* * * * *

UNITED STATES PATENT OFFICE
CERTIFICATE OF CORRECTION

Patent No. 4,003,859                    Dated January 18, 1977

Inventor(s) Harold E. Reymore, Jr. and John K. Zane

It is certified that error appears in the above-identified patent and that said Letters Patent are hereby corrected as shown below:

Column 1, lines 11 and 12:

1. Field of the Invention polyisocyanates to polyisocyanurates and

Should read:

1. <u>Field of the Invention</u>

Column 1, line 16:

polyisocyanurates ad

Should read:

polyisocyanates to polyisocyanurates and

Column 2, line 18:

-M+
$CONR_4$

Should read:

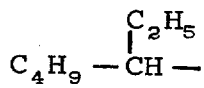
$CONR_4$

Column 3, line 13:

the catalyst

Should read:

a catalyst

Column 5, lines 13 and 14:

poatassium

Should read:

potassium

Column 5, line 53:

compound

Should read:

component

Column 8, lines 16-18:

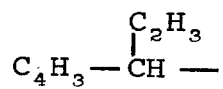

Should read:

$C_4H_9 - \overset{\overset{C_2H_5}{|}}{CH} -$

UNITED STATES PATENT OFFICE
CERTIFICATE OF CORRECTION

Patent No. 4,003,859   Dated January 18, 1977

Inventor(s) Harold E. Reymore, Jr. and John K. Zane

It is certified that error appears in the above-identified patent and that said Letters Patent are hereby corrected as shown below:

Column 8, line 51:

$C_4H_3-CH-C-N-C_4H_3$

Should read:

$C_4H_9-CH-C-N-C_4H_9$

Column 12, Table I:

Cream, sec.  :03   :02   :01—02

Should read:

Cream, sec.  :03   :02   :01-02

Column 13, Table III, line 61:

⊥ to rise   16.8   45.4

Should read:

⊥ to rise   16.8   46.4

Signed and Sealed this

Seventeenth Day of May 1977

[SEAL]

Attest:

RUTH C. MASON
*Attesting Officer*

C. MARSHALL DANN
*Commissioner of Patents and Trademarks*